(No Model.)

W. H. BANKS.
ROACH TRAP.

No. 272,372. Patented Feb. 13, 1883.

Witnesses:
A. C. Eader
John E. Morris

Inventor:
Wm H. Banks
By Chas B. Mann
Attorney

UNITED STATES PATENT OFFICE.

WILLIAM H. BANKS, OF BALTIMORE, MARYLAND, ASSIGNOR OF ONE-HALF TO FREDERICK W. SCHULTZ, OF SAME PLACE.

ROACH-TRAP.

SPECIFICATION forming part of Letters Patent No. 272,372, dated February 13, 1883.

Application filed August 11, 1882. (No model.)

*To all whom it may concern:*

Be it known that I, WILLIAM H. BANKS, a citizen of the United States of America, residing at Baltimore, in the State of Maryland, have invented certain new and useful Improvements in Roach-Traps, of which the following is a specification, reference being had therein to the accompanying drawings.

My invention relates to traps for certain insects—such as roaches—and has for its object to provide a simple and cheap trap for catching these pests.

Figure 1:
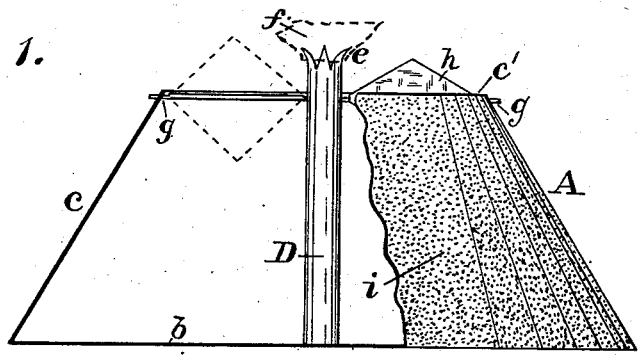
Figure 2:
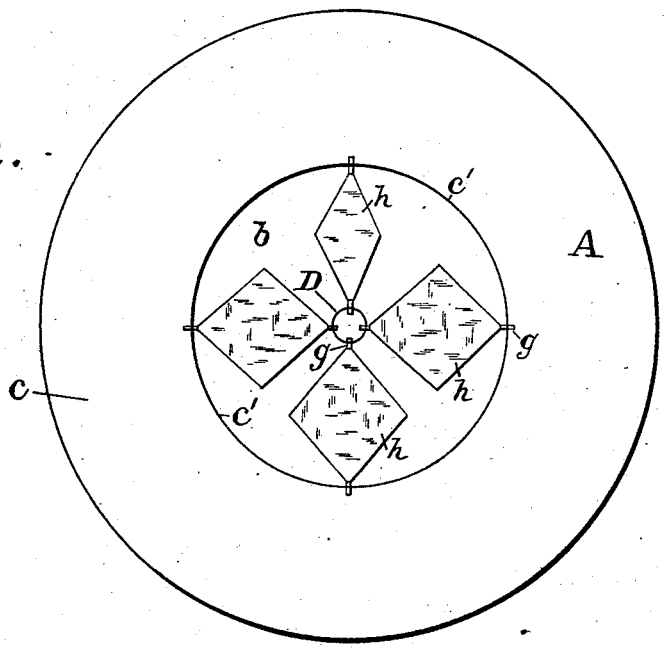

In the drawings, Figure 1 is an elevation of the trap, which shows in part an outside view and in part a vertical section. Fig. 2 is a top view of the trap.

The letter A designates a receptacle, made of sheet metal or other suitable material, having a smooth hard surface. The bottom $b$ of the receptacle is circular, and the side walls, $c$, rising therefrom are inclined. The general shape of the receptacle, therefore, is that of a frustum of a cone. This shape renders it easy for the insect to pass up the outer side of the inclined wall to the rim $c'$ to get into the trap, and renders it correspondingly difficult or impossible for the insect, when once in the trap, to get out. A standard, D, is fixed to the center of the bottom and projects above the top edge of the wall. In the present instance this standard is tubular, and when so made may be constructed of tin-plate. The top of the standard is provided with prongs $e$, on which a piece, $f$, of bread, meat, or other material suitable for bait, may be attached. Across the circular top opening are rods $g$, each having one end loosely pivoted in the wall near the rim and the other end in the standard. As many rods may be thus pivoted as desired. Each rod has a flat plate, $h$, of sheet metal, rigidly secured to it in such manner that the plate will be balanced on the rod. In the present instance the plates are diamond-shaped, or nearly square, and each one may turn independent of the others.

When the insect has passed up the outer wall it will attempt to reach the bait by passing over one of the pivoted plates which bridge the top opening from the rim to the standard. It may pass upon the plate without the latter tilting, because as the plate is pivoted on a line drawn between the two diagonal corners the insect can get upon the plate only at the pivoting-point over the rod $g$, whereat its weight will not cause it to tilt. When once on the plate the slightest deviation of the insect from the straight axial line will cause the plate to tilt, and as the sheet-metal surface is smooth and hard it affords no hold by which the insect may cling; consequently the latter drops into the receptacle.

To render this trap effective by facilitating the entrance into it of the insects the entire outer surface of the wall is roughened, as at $i$, Fig. 1, by covering it with sanded paint, which gives a good foothold.

Having described my invention, I claim—

An insect-trap whose general shape is that of a frustum of a cone, having an opening at the top of the inclined sides, a bait-standard projecting up through the center of the opening, rods loosely pivoted from the rim of the opening to bait-standard, and smooth-surfaced plates secured to the rods, as set forth.

In testimony whereof I affix my signature in presence of two witnesses.

WILLIAM H. BANKS.

Witnesses:
CHAS. B. MANN,
JNO. T. MADDOX.